United States Patent
Lee et al.

(10) Patent No.: US 10,606,761 B2
(45) Date of Patent: Mar. 31, 2020

(54) METHOD FOR ACCESSING FLASH MEMORY MODULE AND ASSOCIATED FLASH MEMORY CONTROLLER AND ELECTRONIC DEVICE

(71) Applicant: Silicon Motion Inc., Hsinchu County (TW)

(72) Inventors: Jie-Hao Lee, Kaohsiung (TW); Chun-Ju Chen, Taichung (TW)

(73) Assignee: Silicon Motion, Inc., Hsinchu County (TW)

(*) Notice: Subject to any disclaimer, the term of this patent is extended or adjusted under 35 U.S.C. 154(b) by 37 days.

(21) Appl. No.: 15/869,003

(22) Filed: Jan. 11, 2018

(65) Prior Publication Data
US 2019/0065394 A1 Feb. 28, 2019

(30) Foreign Application Priority Data
Aug. 30, 2017 (TW) .............................. 106129523 A

(51) Int. Cl.
*G06F 12/1009* (2016.01)
*G06F 12/02* (2006.01)

(52) U.S. Cl.
CPC ...... *G06F 12/1009* (2013.01); *G06F 12/0246* (2013.01); *G06F 2212/1024* (2013.01); *G06F 2212/2022* (2013.01); *G06F 2212/657* (2013.01); *G06F 2212/7201* (2013.01)

(58) Field of Classification Search
CPC ......... G06F 12/1009; G06F 2212/1024; G06F 2212/2022; G06F 2212/657
See application file for complete search history.

(56) References Cited

U.S. PATENT DOCUMENTS

| | | | |
|---|---|---|---|
| 9,658,955 B2* | 5/2017 | Park ..................... | G06F 12/0238 |
| 2016/0062883 A1* | 3/2016 | Byun ................... | G06F 12/0246 |
| | | | 711/103 |
| 2017/0212796 A1 | 7/2017 | Chen | |
| 2018/0004420 A1* | 1/2018 | Jung ..................... | G06F 3/0604 |

FOREIGN PATENT DOCUMENTS

| TW | 201706847 A | 2/2017 |
|---|---|---|
| TW | I579693 B | 4/2017 |
| TW | I587132 B | 6/2017 |

\* cited by examiner

*Primary Examiner* — Eric Cardwell
(74) *Attorney, Agent, or Firm* — Winston Hsu

(57) ABSTRACT

The present invention provides a method for accessing a flash memory module, wherein the method includes: building a physical address to logical address (P2L) table; receiving a read command asking for a data within the flash memory module, wherein the read command includes a first logical address; if the P2L table does not include information associated with the first logical address, reading a logical address to physical address (L2P) table from the flash memory module, and searching a first physical address corresponding to the first logical address according to the L2P table, wherein the first physical address is used to read the data from the flash memory module; and using the P2L table to update the L2P table.

18 Claims, 4 Drawing Sheets

METHOD FOR ACCESSING FLASH MEMORY MODULE AND ASSOCIATED FLASH MEMORY CONTROLLER AND ELECTRONIC DEVICE

BACKGROUND OF THE INVENTION

1. Field of the Invention

The present invention relates to flash memory, and more particularly, to a method for accessing flash memory module and associated flash memory controller.

2. Description of the Prior Art

Typically, a flash memory controller stores a physical address to logical address table or at least one logical address to physical address table in a buffer of the flash memory controller during its operation. Once the flash memory controller receives a read command, the flash memory controller searches the above-mentioned tables for intended physical addresses. However, since block size and amount of pages contained therein increase, the above-mentioned pages have a significant increase in size. As a result, the time needed by searching the physical addresses significantly increases, thereby to have an impact on the performance of the flash memory controller.

SUMMARY OF THE INVENTION

Therefore, it is one object of the present invention to provide a method for accessing the flash memory module, which can effectively search for intended physical addresses when the flash memory controller receives read commands, thereby to improve the performance of the flash memory controller.

According to one embodiment of the present invention, a method for accessing a flash memory module is provided. The method comprises: building a physical address to logical address (P2L) table, which includes consecutive physical addresses and corresponding logical addresses; receiving a first read command requesting for a first data within the flash memory module, wherein the first read command comprises a first logical address; searching the P2L table to determine whether the P2L table includes information associated with the first logical address; if the P2L table does not include the information associated with the first logical address, reading a logical address to physical address (L2P) table from the flash memory module, and searching the L2P table for a first physical address corresponding to the first logical address, thereby to read the first data from the flash memory module; and using the P2L table to update content of the L2P table.

According to another embodiment of the present invention, a flash memory controller is provided. The flash memory controller is arranged to access a flash memory module and comprises: a read-only memory; a microprocessor and a memory. The read-only memory is arranged to store a program code. The microprocessor is arranged to execute the program code to control access to the flash memory module. The memory is arranged to store a physical address to logical address (P2L) table, wherein the P2L table includes consecutive physical addresses and corresponding logical addresses. When the microprocessor receives a first read command requesting for a first data within the flash memory module, the microprocessor searches the P2L table to determine whether the P2L table includes information associated with the first logical address; if the P2L table does not include the information associated with the first logical address, the microprocessor reads a logical address to physical address (L2P) table from the flash memory module, and searches the L2P table for a first physical address corresponding to the first logical address, thereby to read the first data from the flash memory module; and the microprocessor uses the P2L table to update content of the L2P table.

According to another embodiment of the present invention, an electronic device is provided. The electronic device comprises: a flash memory module; and a flash memory controller. The flash memory controller is arranged to access the flash memory module and build a physical address to logical address (P2L) table, which includes consecutive physical addresses and corresponding logical addresses. When the flash memory controller receives a first read command requesting for a first data within the flash memory module, the flash memory controller searches the P2L table to determine whether the P2L table includes information associated with the first logical address; if the P2L table does not include the information associated with the first logical address, the flash memory controller reads a logical address to physical address (L2P) table from the flash memory module, and searches the L2P table for a first physical address corresponding to the first logical address, thereby to read the first data from the flash memory module; and the flash memory controller uses the P2L table to update content of the L2P table.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
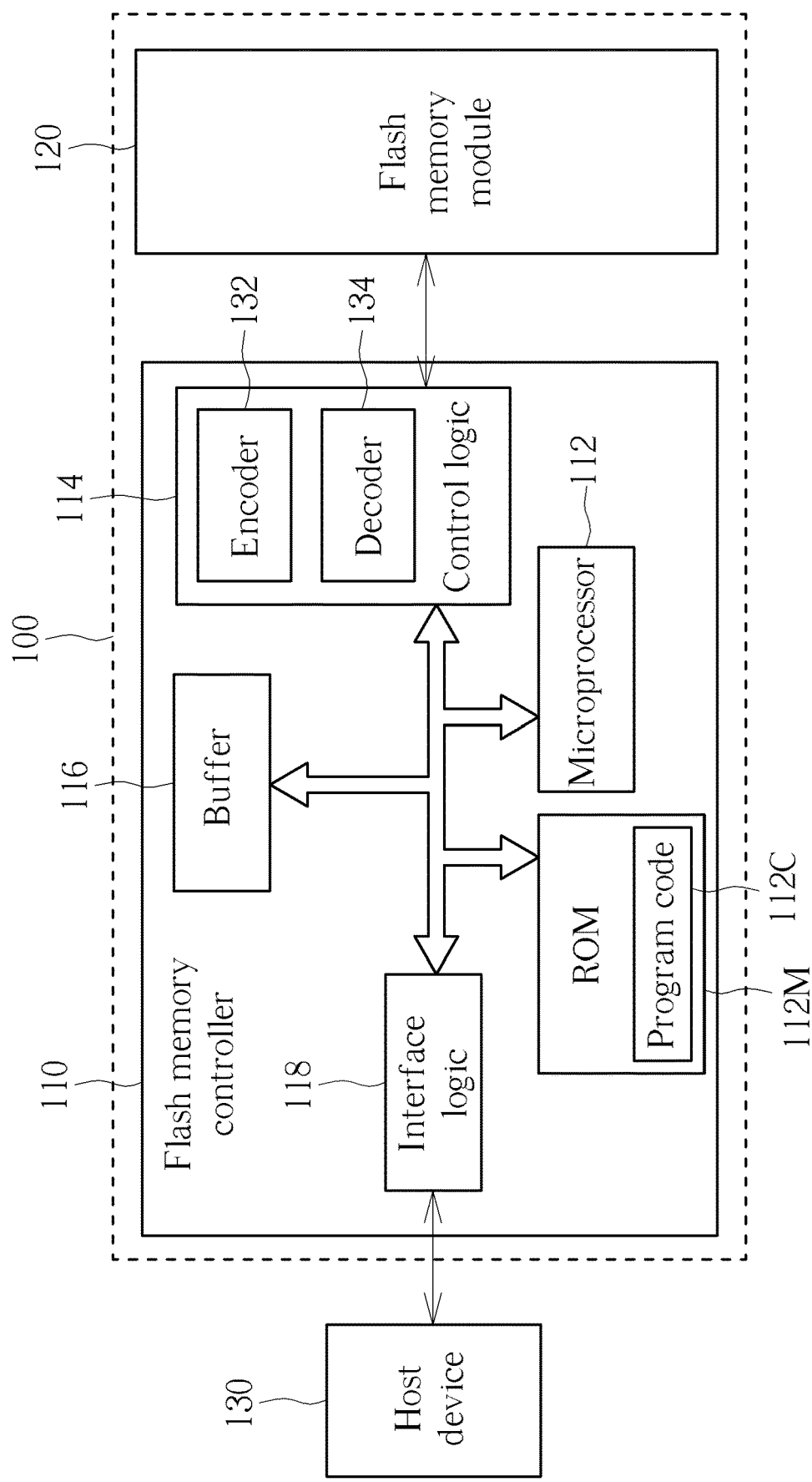
FIG. 1 illustrates a diagram of a memory device according to one embedment of the present invention.

Please refer to FIG. 1, which illustrates a diagram of a memory device 100 according to one embodiment of the present invention. The memory device 100 includes a flash memory module 120 and a flash memory controller 110. The flash memory controller 110 is arranged to access the flash memory module 120. In this embodiment, the flash memory controller 110 includes a microprocessor 112, a read only memory (ROM) 112M, a control logic 114, a buffer 116 and an interface logic 118. The ROM 112M is arranged to store a program code 112C, and the microprocessor 112 is arranged to execute the program code 112C and control the access to the flash memory controller 120. The control logic 114 includes an encoder 132 and a decoder 134. The encoder 132 is arranged to encode data that is written to the flash memory module 120, thereby to generate corresponding checksum code (which is also called error correction code (ECC)), while the decoder 134 is arranged to decode data that is read from the flash memory module 120.

In a typical condition, the flash memory module 120 includes multiple flash memory chips, wherein each of flash memory chips includes multiple blocks. The controller (e.g. the flash memory controller 110 that controls the microprocessor 112 to execute the program code 112C) performs erase operations on the flash memory module 120 on a block basis. Further, one block can record a certain amount of pages, wherein the controller (e.g. the flash memory controller 110 that controls the microprocessor 112 to execute the program code 112C) performs write operations on the flash memory module 120 on a page basis. In this embodiment, the flash memory module 120 is a 3D NAND-type flash.

In practical, the flash memory controller 110 that controls the microprocessor 112 to execute the program code 112C can utilize its internal components for implementing various control operations. For example, utilizing the control logic 114 to control the access to the flash memory module 120 (especially access to at least one block or at least one page), utilizing the buffer 116 for necessary data buffering and utilizing the interface logic 118 to communicate with a host device 130. The buffer 116 can be implemented with random access memory (RAM), such as a static RAM. However, this is not intended to be a limitation of the present invention.

In one embodiment, the memory device 100 could be (but not limited to): portable memory device (such as memory card compliant with SD/MMC, CF, MS or XD standard). The host device 130 could be an electronic device that is connectable to the memory device, such as a cellular phone, a laptop, a desktop and so on. In another embodiment, the memory device 100 could be a solid state storage (SSD) or an embedded storage device that is compliant with UFS or EMMC standard. In such case, the memory device 100 is disposed in an electronic device, such as a cellular phone, a laptop, or a desktop and the host device 130 could be a processor of the electronic device.

Figure 2:
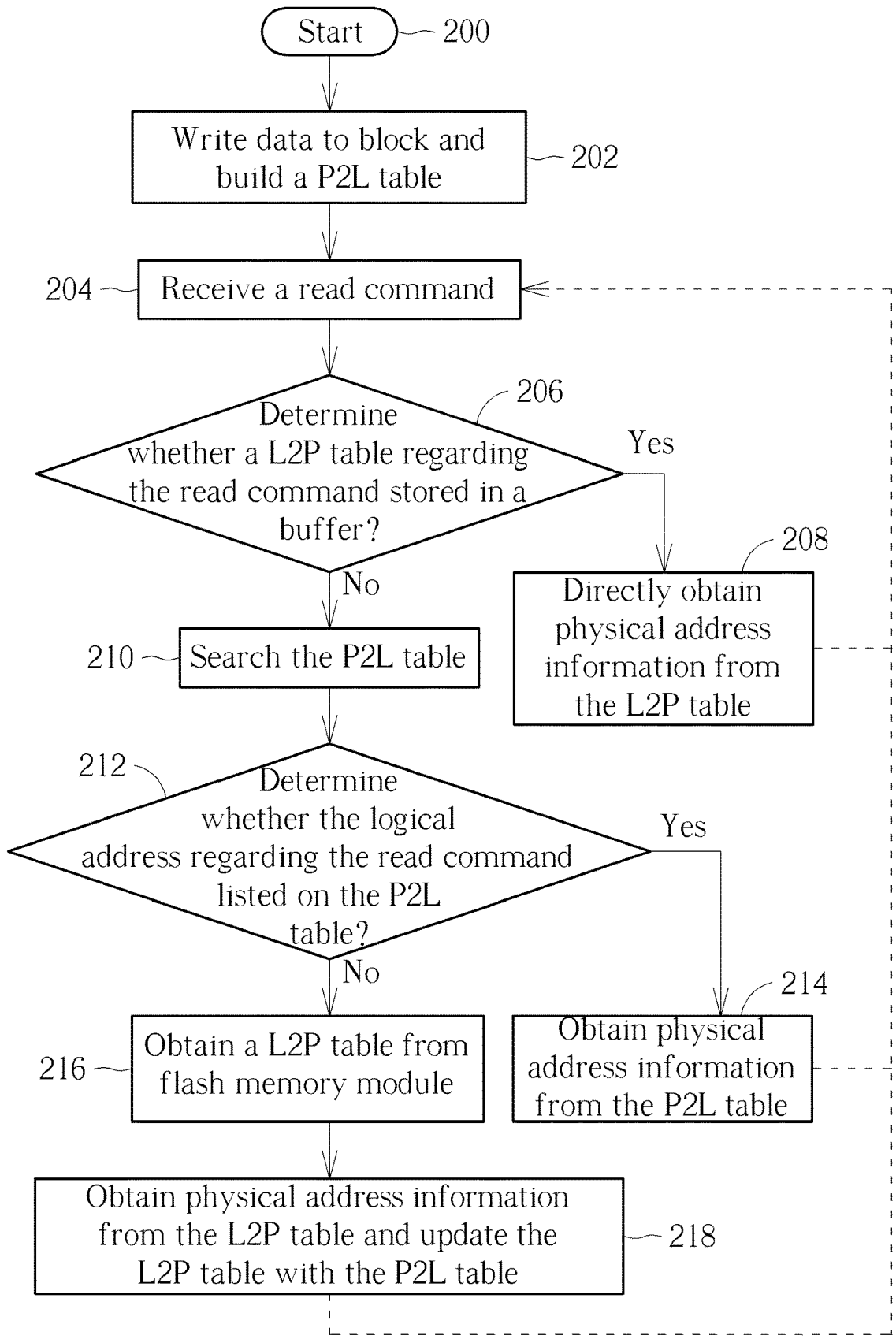
FIG. 2 illustrates a flow chart of accessing a flash memory module according to one embedment of the present invention.
Figure 3:
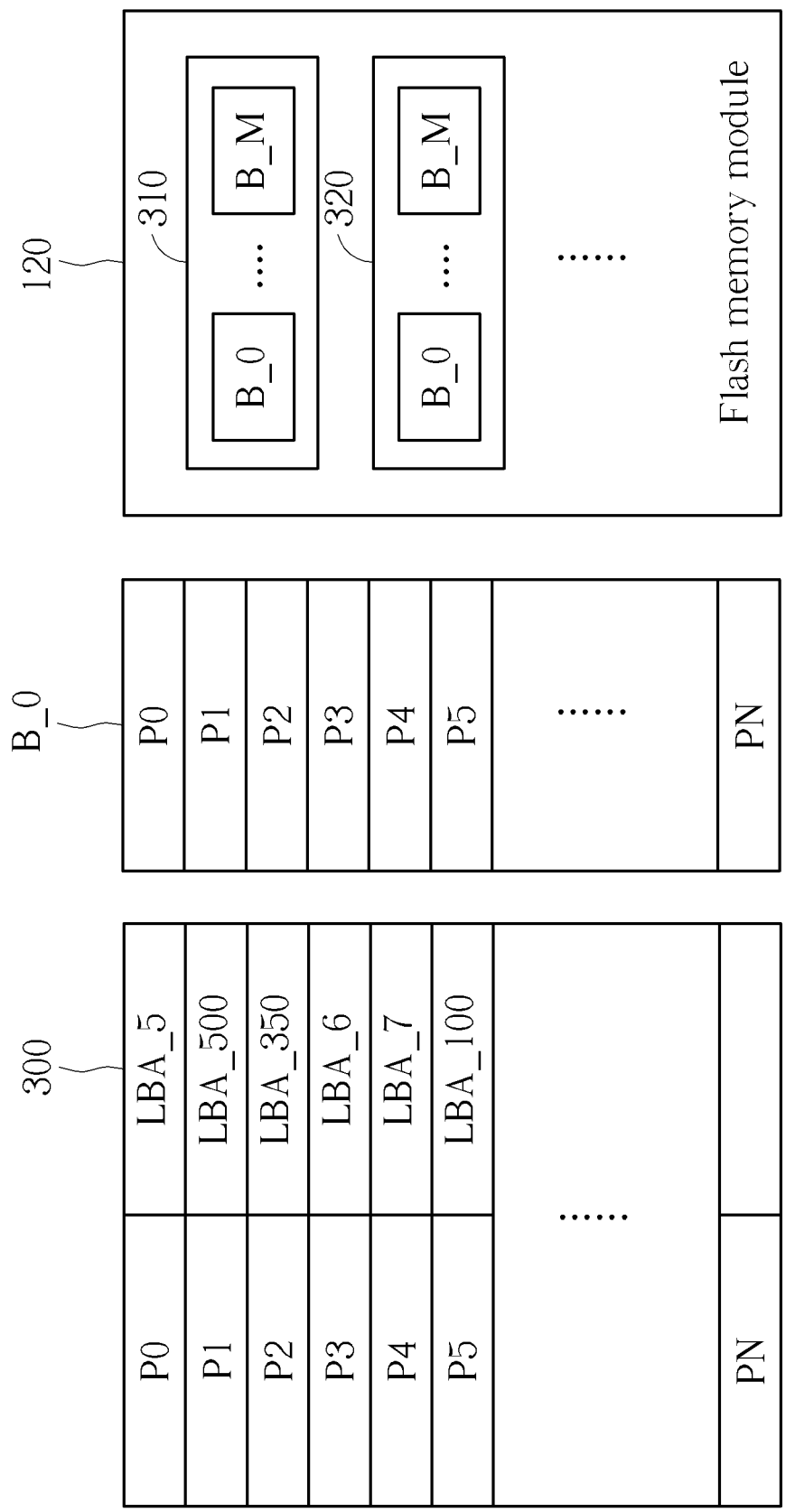
FIG. 3 illustrates a diagram of a physical address to logical address table according to one embedment of the present invention.

Please refer to FIG. 2, which illustrates a flow chart of accessing the flash memory module 120 according to one embodiment of the present invention. At step 200, the flow starts. At step 202, the flash memory controller 110 receives at least one write command from the host device 130, thereby to write multiple data to one block of the flash memory module 120. In this embodiment, as illustrated in FIG. 3, the flash memory module 120 includes multiple flash memory chips 310 and 320, each of which includes multiple blocks B0-B_M, and each block comprises N pages P0-PN. In the following descriptions, the flash memory controller 110 is described as sequentially writing data to the block B_0 of the flash memory chips 310. Please note that, however, the above-mentioned "block" may be implemented with multiple blocks of multiple chips that are located on different planes (which is also known as a "superblock"). For example, assuming that the flash memory chips 310 and 320 both comprise two planes and the blocks B_0 and B_M are located on different planes, respectively, the blocks B_0 and B_M of the flash memory chip 310 and the blocks B_0 and B_M of the flash memory chip 320 could form a superblock.

On the other hand, before the data is written to the block B_0, the microprocessor 112 builds a physical address to logical address (P2L) table 300 and the P2L table 300 will be stored in the buffer 116. The P2L table 300 includes physical addresses P0-PN of consecutive pages in the block B_0 and their corresponding logical addresses. Specifically, the flash memory controller 110 first writes the data that is from the host device 130 and associated with the logical address LBA_5 into page P0. Then, sequentially write the data that is from the host device 130 and associated with the logical addresses LBA_500, LBA_350, LBA_6, LBA_7, and LBA_100, into pages P1-P5. Please note that, in this embodiment, serial numbers of the logical addresses represent their orders, and consecutive serial numbers represent consecutive logical addresses.

At step 204, the flash memory controller 110 receives a first read command from the host device 130. The first read command requests for reading data having a first logical address from the flash memory module 120. At step 206, the microprocessor 112 determines whether a logical address to physical address (L2P) table comprising the first logical address has been stored in the buffer 116. More specifically, the flash memory module 120 stores multiple L2P tables, and each of the L2P tables comprises mapping information associated with a certain range of logical addresses. For example, a first one of L2P tables may be used for storing physical addresses associated with the logical addresses LBA_0-LBA_255 (note that not necessarily every physical address corresponding to the logical address exists), a second one of the L2P tables may be used for storing physical addresses associated with the logical addresses LBA_256-LBA_511, a third one of the L2P tables may be used for storing physical addresses associated with the logical addresses LBA_512-LBA_767 . . . and so on. Therefore, if the first logical address is LBA_20, the microprocessor 112 determines whether the first one of L2P tables that is used for storing the logical addresses LBA_0-LBA_255 has been stored in the buffer 116. If yes, the flow goes to step 208; otherwise, the flow goes to step 210. The logical address LBA_20 will be regarded as the first logical address in the following examples.

At step 208, if the first L2P table has been stored in the buffer 116, the microprocessor 112 can directly search the first one of the L2P tables stored in the buffer 116 for the physical address corresponding to the first logical address LBA_20. Accordingly, the microprocessor 112 can find out data stored at the found physical address from the flash memory module 120 according to the found physical address.

At step 210, the microprocessor 112 searches the P2L table 300 and determines whether the first logical address LBA_20 is listed on the P2L table 300. If yes, the flow goes to step 214; otherwise, the flow goes to step 216.

At step 214, the microprocessor 112 is operable to directly search the P2L table stored in the buffer 116 for the physical address corresponding to the first logical address LBA_20. According to the found physical address, the microprocessor 112 is able to find the data stored at the found physical address from the flash memory module 120.

At step 216, since the information that is associated with the first logical address LBA_20 is not stored in the buffer 116, the microprocessor 112 reads a L2P table including the first logical address LBA_20 from the flash memory module 120 according to the logical address LBA_20. In this embodiment, the microprocessor 112 reads the first one of L2P tables recording the logical addresses LBA_0-LBA_255 from the flash memory module 120 and stores it into the buffer 116.

Figure 4:
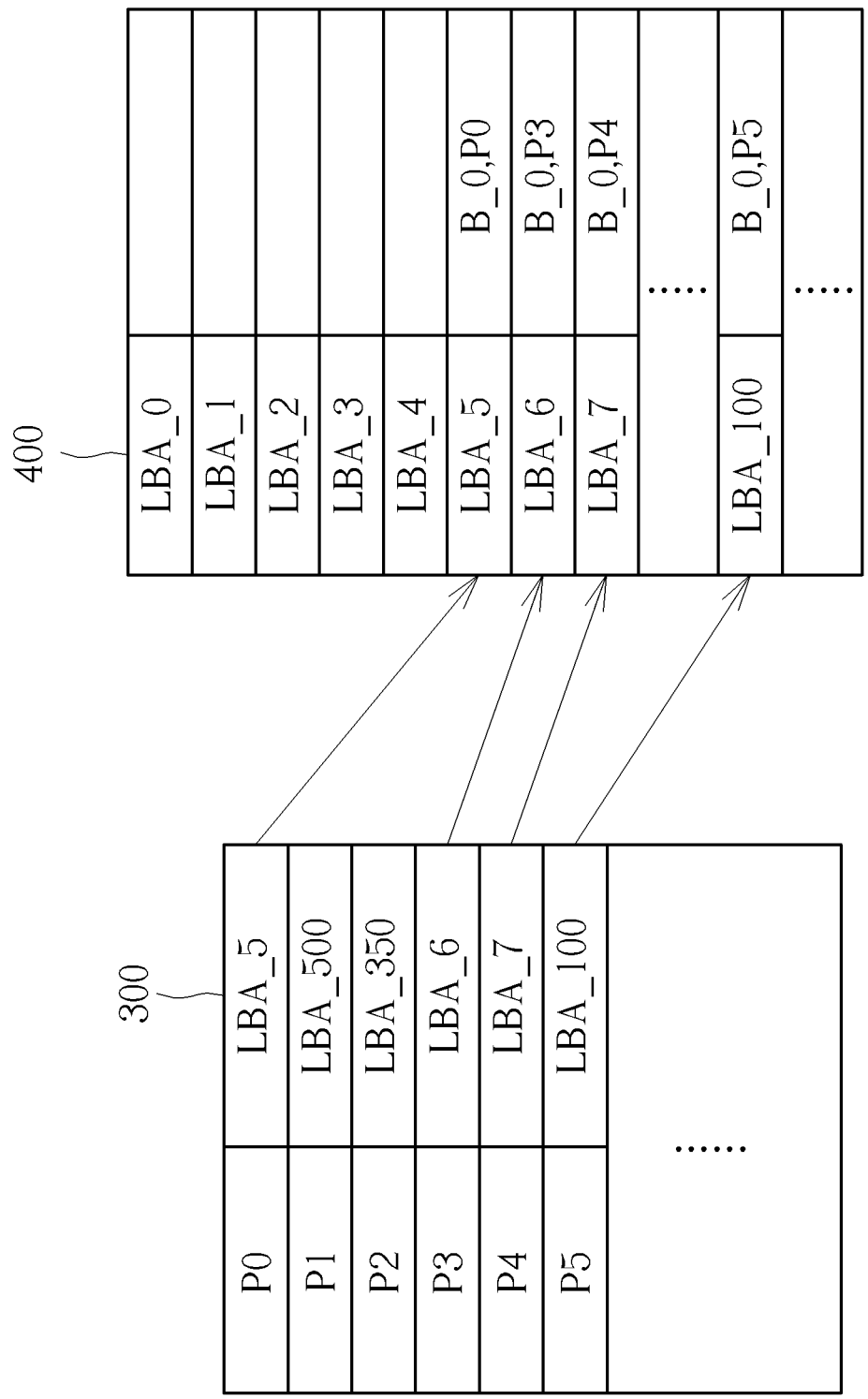
FIG. 4 illustrates a diagram showing how to use a physical address to logical address table to update a logical address to physical address table according to one embedment of the present invention.

At step 218, the microprocessor 112 searches the first one of the L2P tables for a physical address corresponding to the first logical address LBA_20. According to the found physical address, the microprocessor 112 reads the data stored at the found physical address from the flash memory module 120. In addition, the microprocessor 116 also uses the P2L table 300 to update the first one of the L2P tables, such that the first one of the L2P tables contains the latest information. More specifically, please refer to FIG. 4, which illustrates a diagram showing how to use P2L table 300 to update a first L2P table 400. In FIG. 4, since P2L table 300 includes four pieces of information corresponding to the logical addresses LBA_0-LBA_255, the microprocessor 112 updates the logical address LBA_5 in the first L2P 400 to associates with the page P0 of the block B_0, updates the logical address LBA_6 to be associated with the page P3 of the block B_0, updates the logical address LBA_7 to be associated with the page P4 of the block B_0, and updates the logical address LBA_100 to be associated with the page P5 of the block B_0.

Please note that when the first one of the L2P tables is read from the flash memory module 120 but not updated, the first one of the L2P tables could not include physical addresses corresponding to the logical addresses LBA_5, LBA_6, LBA_7 or LBA_100. At this time, the microprocessor 112 adds the information recorded in the P2L table 300, which is associated with the above-mentioned four logical addresses, into the first one of the L2P tables. Alternatively, if the L2P table has included the physical addresses corresponding to the logical address LBA_5, LBA_6, LBA_7 or LBA_100, the microprocessor 112 will update, physical addresses corresponding to the logical address LBA_5, LBA_6, LBA_7 or LBA_100, in the first one of L2P tables according to the above-mentioned information in the P2L table 300.

As described in the above embodiments, when the microprocessor 112 reads the L2P tables from the flash memory module 120 and writes it into the buffer 116 in response to the read command, the microprocessor 112 immediately updates the read L2P table using the P2L table 300 containing the latest information and currently stored in buffer 116 such that the L2P table stored in the buffer 116 could contain the latest information. In one embodiment, the above-mentioned updating operation is completed during the execution of the first read command, such that the flash memory controller 110 can obtain correct information in step 208 if receiving other read commands in the following.

For example, the flow returns back to step 204 and the flash memory controller 110 receives a second read command from the host 130, which requests for reading a second data having a second logical address from the flash memory module 120. Assuming that the second logical address is LBA_7, the flow will forward to step 208 from step 206. That is, the microprocessor 112 is operable to directly obtain the physical address (i.e., page P4 of the block B_0) corresponding to the logical address LBA_7 from the first L2P table 400 in the buffer 116, without searching the logical address in any PL2 table. Since the time needed by searching the logical address in the P2L table will be significantly longer than the time needed by obtaining the physical address from the L2P table according to the logical address. Therefore, the above-mentioned embodiment can save the time needed by searching the physical address, thereby improving the performance of the flash memory controller 110.

On the other hand, assuming that the second logical address is LBA_260 and is not included in the P2L table 300, the flow goes to step 216, in which the a L2P table including the second logical address LBA_260 (e.g., a second one of L2P tables storing LBA_256-LBA_511) is loaded from the flash memory module 120 and stored into the buffer 116. Then, the microprocessor 112 searches the second one of the L2P tables for the physical address corresponding to the second logical address LBA_260. According to the found physical address, data stored at the found physical address is read from the flash memory module 120. The P2L table 300 is used to update the second one of the L2P tables. That is, the logical address LBA_350 in the second one of the L2P tables is updated to be associated with page P2 of the block B_0 and the logical address LBA_500 in the second one of the L2P tables is updated to be associated with page P1 of the block B_0, such that all the content stored in the second one of L2P tables will be the latest information.

In addition, the flash memory controller 110 may continually write data to the block B_0. However, the data that is to be written to the block could be updating data regarding the data that has been written previously (i.e., having identical logical address). Hence, in one embodiment, to avoid a potential lookup error, once data is written to the block B_0, one or more L2P tables that are previously loaded in response to the previous read command will be set as invalid. That is, the L2P tables in the buffer 116 will be marked as invalid or be deleted. In another embodiment, once data is written to the block B_0, the flash memory controller 110 updates one or more L2P tables that are previously loaded in response to the previous read command, according to the logical address and the physical address of the data that is currently written to the block B_0. Thus, the L2P tables stored in the buffer 116 will contain the latest information.

Furthermore, the above-mentioned L2P table loaded from the flash memory module 120 in response to the read command is for temporary use. That is, until all the pages in the block B_0 have been written, the microprocessor 112 will fully convert the data in the P2L table 300 and store the data in one or more corresponding L2P tables. The P2L table 300 and the one or more updated L2P tables will be stored in the flash memory module 120.

In summary, in the inventive method of accessing the flash memory module, once the logical address included in the read command does not exist in the buffer of the flash memory controller, a L2P table will be read from the flash memory module and stored in the buffer of the flash memory controller. Accordingly, a P2L table will be used to update the L2P table such that the L2P table can contain the latest information. As mentioned above, with updating operation performed in the present invention, as long as the L2P table corresponding to the logical address of the read command is stored in the buffer, the microprocessor can directly obtain correct/latest information of the physical address from this L2P table, without search the P2L table for corresponding logical address. As a result, the read speed of the flash memory controller can accelerate, thereby improving the system performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A method for accessing a flash memory module, comprising:
building a physical address to logical address (P2L) table within a buffer of a flash memory controller, which includes consecutive physical addresses and corresponding logical addresses;

receiving a first read command requesting for a first data within the flash memory module, wherein the first read command comprises a first logical address;

searching the P2L table to determine whether the P2L table includes information associated with the first logical address;

if the P2L table does not include the information associated with the first logical address, reading a logical address to physical address (L2P) table having a range of logic addresses from the flash memory module, storing the L2P table in the buffer of the flash memory controller, and searching the L2P table for a first physical address corresponding to the first logical address, thereby to read the first data from the flash memory module; and using the P2L table to update content of the L2P table to generate an updated L2P table;

receiving a second read command requesting for a second data within the flash memory module, wherein the second read command comprises a second logical address;

if the P2L table and the updated L2P table are within the buffer of the flash memory controller when receiving the second read command, and if the second logical address falls within the range of the logical addresses, directly searching the L2P table for a second physical address corresponding to the second logical address without searching the P2L table, thereby to read the second data from the flash memory module.

2. The method of claim 1, wherein the L2P table includes a range of logic addresses and the step of using the P2L table to update the content of the L2P table comprises:

using at least one physical address in the P2L table that corresponds to the range of the logic addresses to update the L2P table.

3. The method of claim 1, wherein the flash memory module comprises a plurality of flash memory chips, each flash memory chip comprises a plurality of block, each block comprises a plurality of pages, and the P2L table and the L2P table record information on a page basis.

4. The method of claim 1, further comprising:

if the second logical address does not fall within the range of the logical addresses, searching the P2L table to determine whether the P2L table includes information associated with the second logical address;

if the P2L table does not include the information associated with the second logical address, reading another L2P table from the flash memory module, and searching the another L2P table for the second physical address, thereby to read the second data from the flash memory module; and using the P2L table to update content of the another L2P table.

5. The method of claim 1, wherein the P2L table corresponds to a block of the flash memory module, and the method further comprises:

receiving a write command comprising the logical addresses;

writing data corresponding to the write command to pages having the consecutive physical addresses of the block, after the P2L table is built;

wherein the step of receiving the first read command and the step of receiving the second read command are performed when the block is not fully written and has space for a next write command.

6. The method of claim 5, further comprising:

receiving a next write command after the step of receiving the second read command is executed;

writing data corresponding to the next write command to the block; and once the data corresponding to the next write command is written to the block, the updated L2P table is marked as invalid or is deleted.

7. A flash memory controller, wherein the flash memory controller is arranged to access a flash memory module, the flash memory controller comprising:

a read-only memory arranged to store a program code;

a microprocessor arranged to execute the program code to control access to the flash memory module; and a buffer arranged to store a physical address to logical address (P2L) table, wherein the P2L table includes consecutive physical addresses and corresponding logical addresses;

wherein when the microprocessor receives a first read command requesting for a first data within the flash memory module, the microprocessor searches the P2L table to determine whether the P2L table includes information associated with the first logical address; if the P2L table does not include the information associated with the first logical address, the microprocessor reads a logical address to physical address (L2P) table having a range of logic addresses from the flash memory module, stores the L2P table in the buffer, and searches the L2P table for a first physical address corresponding to the first logical address, thereby to read the first data from the flash memory module; and the microprocessor uses the P2L table to update content of the L2P table to generate an updated L2P table;

wherein the microprocessor further receives a second read command requesting for a second data within the flash memory module, wherein the second read command comprises a second logical address; and if the P2L table and the updated L2P table are within the buffer of the flash memory controller when the microprocessor receives the second read command, and if the second logical address falls within the range of the logical addresses, the microprocessor directly searches the L2P table for a second physical address corresponding to the second logical address without searching the P2L table, thereby to read the second data from the flash memory module.

8. The flash memory controller of claim 7, wherein the L2P table includes a range of logic addresses and the microprocessor uses at least one physical address in the P2L table that corresponds to the range of the logic addresses to update the L2P table.

9. The flash memory controller of claim 7, wherein the flash memory module a plurality of flash memory chips, each flash memory chip comprises a plurality of block, each block comprises a plurality of pages, and the microprocessor uses the P2L table and the L2P table on a page basis.

10. The flash memory controller of claim 7, wherein if the second logical address does not fall within the range of the logical addresses, the microprocessor searches the P2L table to determine whether the P2L table includes information associated with the second logical address; and if the P2L table does not include the information associated with the second logical address, the microprocessor reads another L2P table from the flash memory module, and searching the another L2P table for the second physical address, thereby to read the second data from the flash memory module; and the microprocessor uses the P2L table to update content of the another L2P table.

11. The flash memory controller of claim 7, wherein the P2L table corresponds to a block of the flash memory module, and the microprocessor receives a write command comprising the logical addresses, writes data corresponding to the write command to pages having the consecutive physical addresses of the block after the P2L table is built, and the microprocessor receives the first read command and the second read command when the block is not fully written and has space for a next write command.

12. The flash memory controller of claim 11, wherein the microprocessor receives a next write command after the second read command is executed, and writes data corresponding to the next write command to the block, and once the data corresponding to the next write command is written to the block, the updated L2P table is marked as invalid or is deleted.

13. An electronic device, comprising:
a flash memory module; and
a flash memory controller arranged to access the flash memory module and build a physical address to logical address (P2L) table within a buffer of a flash memory controller, which includes consecutive physical addresses and corresponding logical addresses;
wherein when the flash memory controller receives a first read command requesting for a first data within the flash memory module, the flash memory controller searches the P2L table to determine whether the P2L table includes information associated with the first logical address; if the P2L table does not include the information associated with the first logical address, the flash memory controller reads a logical address to physical address (L2P) table having a range of logic addresses from the flash memory module, stores the L2P table in the buffer, and searches the L2P table for a first physical address corresponding to the first logical address, thereby to read the first data from the flash memory module; and the flash memory controller uses the P2L table to update content of the L2P table to generate an updated L2P table;
wherein the flash memory controller further receives a second read command requesting for a second data within the flash memory module, wherein the second read command comprises a second logical address; and if the P2L table and the updated L2P table are within the buffer of the flash memory controller when the flash memory controller receives the second read command, and if the second logical address falls within the range of the logical addresses, the flash memory controller directly searches the L2P table for a second physical address corresponding to the second logical address without searching the P2L table, thereby to read the second data from the flash memory module.

14. The electronic device of claim 13, wherein the L2P table includes a range of logic addresses and the flash memory controller uses at least one physical address in the P2L table that corresponds to the range of the logic addresses to update the L2P table.

15. The electronic device of claim 13, wherein the flash memory module a plurality of flash memory chips, each flash memory chip comprises a plurality of block, each block comprises a plurality of pages, and the flash memory controller uses the P2L table and the L2P table on a page basis.

16. The electronic device of claim 13, wherein the if the second logical address does not fall within the range of the logical addresses, the flash memory controller searches the P2L table to determine whether the P2L table includes information associated with the second logical address; and if the P2L table does not include the information associated with the second logical address, the flash memory controller reads another L2P table from the flash memory module, and searching the another L2P table for the second physical address, thereby to read the second data from the flash memory module; and the flash memory controller uses the P2L table to update content of the another L2P table.

17. The electronic device of claim 13, wherein the P2L table corresponds to a block of the flash memory module, and the flash memory controller receives a write command comprising the logical addresses, writes data corresponding to the write command to pages having the consecutive physical addresses of the block after the P2L table is built, and the flash memory controller receives the first read command and the second read command when the block is not fully written and has space for a next write command.

18. The electronic device of claim 17, wherein the flash memory controller receives a next write command after the second read command is executed, and writes data corresponding to the next write command to the block, and once the data corresponding to the next write command is written to the block, the updated L2P table is marked as invalid or is deleted.

* * * * *